United States Patent
Sugiyama

(10) Patent No.: US 12,436,406 B2
(45) Date of Patent: Oct. 7, 2025

(54) LENS APPARATUS AND IMAGE PICKUP APPARATUS

(71) Applicant: CANON KABUSHIKI KAISHA, Tokyo (JP)

(72) Inventor: Tomohiko Sugiyama, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 500 days.

(21) Appl. No.: 18/165,167

(22) Filed: Feb. 6, 2023

(65) Prior Publication Data
US 2023/0266605 A1 Aug. 24, 2023

(30) Foreign Application Priority Data
Feb. 18, 2022 (JP) .................................. 2022-023384

(51) Int. Cl.
G02B 27/64 (2006.01)
G02B 7/10 (2021.01)

(52) U.S. Cl.
CPC .......... *G02B 27/648* (2013.01); *G02B 7/102* (2013.01)

(58) Field of Classification Search
None
See application file for complete search history.

(56) References Cited

U.S. PATENT DOCUMENTS

| 2011/0158621 A1* | 6/2011 | Honsho | G03B 17/12 |
| | | | 396/55 |
| 2022/0137487 A1* | 5/2022 | Kudo | G03B 5/04 |
| | | | 396/86 |

FOREIGN PATENT DOCUMENTS

JP 2011128594 A 6/2011

* cited by examiner

*Primary Examiner* — Robert E. Tallman
(74) *Attorney, Agent, or Firm* — Canon U.S.A., Inc. IP Division

(57) ABSTRACT

An apparatus including: a first frame holding a first optical element, a second frame holding a second optical element, a third frame holding a third optical element, in order along an optical axis; a first driving unit moving the first frame when energized and holding the first frame when unenergized; a second driving unit moving the second frame when energized and not holding the second frame when unenergized; a third driving unit moving the third frame when energized and hold a position of the third frame when unenergized; and a controller controlling the first, second and third driving units, wherein the controller controls the second driving unit to become unenergized after at least a part of at least one of the first and third frames is moved within a movable range of the second frame.

20 Claims, 15 Drawing Sheets

LENS APPARATUS AND IMAGE PICKUP APPARATUS

BACKGROUND

Technical Field

The aspect of the embodiments relates to a lens apparatus and an image pickup apparatus.

Description of the Related Art

A lens barrel in an optical equipment such as video cameras performs zooming and focusing by moving a moving frame holding a lens toward an optical axis direction by a driving force from a driving source.

A stepping motor, a voice coil motor and the like are used as a driving unit (driving source) to move the moving frame in the optical axis direction.

The voice coil motor does not generate a force (a self-holding force) to keep the moving frame stopped in an unenergized state with the electric power supply turned off.

Therefore, in the unenergized state, an optical element and the moving frame may be moved by their own weight or an inertial force, and the moving frame may collide with a member (an end member) that limits its movable range. Japanese Patent Application Laid-Open No. 2011-128594 discloses a lens barrel having a first moving frame configured to move with a drive source having a self-holding force in unenergized state, a second moving frame configured to move with a drive source having no self-holding force in unenergized state, and a shock absorbing part provided in the first moving frame. In the lens barrel disclosed in Japanese Patent Application Laid-Open No. 2011-128594, in unenergized state, a part of the first moving frame is controlled to be located within a movable range of the second moving frame to narrow the movable range of the second moving frame, thereby reducing an impact of a collision.

In addition to the shock-absorbing structure, even if the movable range of the second moving frame is limited, it is difficult to suppress a generation of collision sound with a mechanical end because the second moving frame moves due to a change in posture and other factors when the device is not energized.

SUMMARY

The aspect of the embodiments provides a lens apparatus including: a first frame holding a first optical element, a second frame holding a second optical element, a third frame holding a third optical element, arranged in order along an optical axis; a first driving unit configured to move the first frame in an optical axis direction in an energized state, and hold a position of the first frame in an unenergized state; a second driving unit configured to move the second frame in the optical axis direction in the energized state, and not hold a position of the second frame in the unenergized state; a third driving unit configured to move the third frame in the optical axis direction in the energized state, and hold a position of the third frame in the unenergized state; and a controller configured to control the first driving unit, the second driving unit and the third driving unit, in which the controller controls the second driving unit to become the unenergized state from the energized state after at least a part of at least one of the first frame and the third frame is moved within a movable range of the second frame.

Further features of the disclosure will become apparent from the following description of exemplary embodiments with reference to the attached drawings.

DESCRIPTION OF THE EMBODIMENTS

The exemplary embodiment of the disclosure will be described below with reference to the drawings.

Embodiment 1

Figure 1:
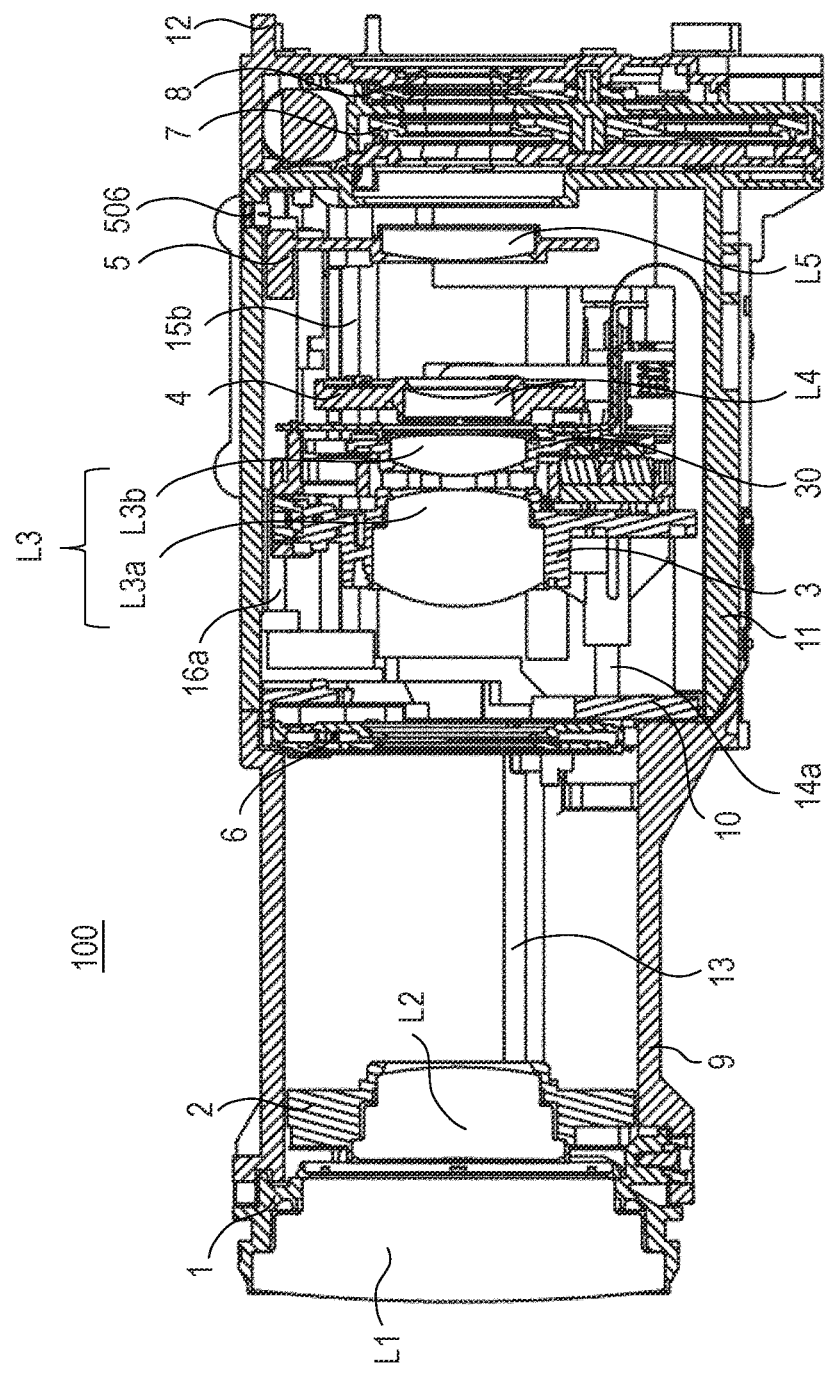
FIG. 1 is a sectional view of the lens apparatus of Embodiment 1.

FIG. 1 is a sectional view of a lens barrel 100 of Embodiment 1.

The lens barrel 100 includes a magnification-varying optical system (a zoom lens system) including five lens units L1-L5 each containing at least one optical element, a light amount adjusting unit 6, an ND unit 7 and an IR unit 8.

The first lens unit L1 is not moved in a direction of an optical axis. The second lens unit L2, the third lens unit (a first optical element) L3 and the fifth lens unit (a third optical element) L5 are moved in an optical direction to perform zooming. The third lens unit L3, which is composed of a 3a lens subunit L3a and a 3b lens subunit L3b, is an optical system not only for zooming, but also for image stabilization. The 3b lens subunit L3b is a lens unit for image stabilization configured to move (be shifted) in a direction perpendicular to the optical axis to reduce image blurring.

The fourth lens unit L4 (a second optical element) is configured to move in the optical direction to correct an image plane variation associated with zooming. The fourth lens unit L4 also serves as a focus lens unit configured to move in the optical axis direction to adjust focus.

The first holding frame 1 holds the first lens unit L1. An L2 moving frame 2 holds the second lens unit L2. A first moving frame 3 holds the 3a lens subunit L3a and an image stabilization moving frame 30 holds the 3b lens subunit L3b. The image stabilization moving frame 30 is mounted movably in the direction perpendicular to the optical axis with respect to the first moving frame 3. A second moving frame 4 holds the fourth lens unit L4. A third moving frame 5 holds the fifth lens unit L5.

A front fixed barrel 9 is coupled with the first holding frame 1 at its front end to secure the first lens unit L1 in place. In addition, a rear end of the front fixed barrel 9 is coupled with a rear fixed barrel 11 described below.

A middle fixed barrel 10 holds a light amount adjusting unit 6, and a rear end of the middle fixed barrel 10 is coupled to a rear fixed barrel 11 described below. The light amount adjusting unit 6 is configured to move an aperture blade in a plane perpendicular to the optical axis by a driving part (not shown) to change an aperture of the optical system to adjust an amount of light.

The rear fixed barrel 11 is coupled to the front fixed barrel 9 and the middle fixed barrel 10 at its front end and is coupled to a second holding frame 12 described below at its rear end.

The second holding frame 12 is coupled to the rear fixed barrel 11 at its front end and includes the ND unit 7, the IR unit 8 and an image pickup element (not shown). When a light quantity adjustment is performed by changing an aperture area of an aperture stop, the aperture amount of the aperture stop becomes small when picking up an image of a high-brightness object, an optical performance deteriorates due to a diffraction phenomenon of light. Therefore, the ND unit 7 uses a filter to reduce the amount of light. The IR unit 8 has a mechanism to place an infrared light cut filter in front of the image pickup element in the optical axis direction for use in a visible light range and to remove the infrared light cut filter for use in a near infrared light range.

An image pickup element (not shown) is an image pickup unit that photoelectrically converts the object image formed by the lens units L1 to L5.

A first guide bar (not shown) is held at both ends by the front fixed barrel 9 and the middle fixed barrel 10. A second guide bar 13 is held at both ends by the front fixed barrel 9 and the rear fixed barrel 11. The L2 moving frame 2 is supported movably in the optical axis direction by the first guide bar and the second guide bar 13.

Components of a driving unit 200 according to Embodiment 1 are described in detail below with reference to FIGS. 2 to 7.

Figure 2:
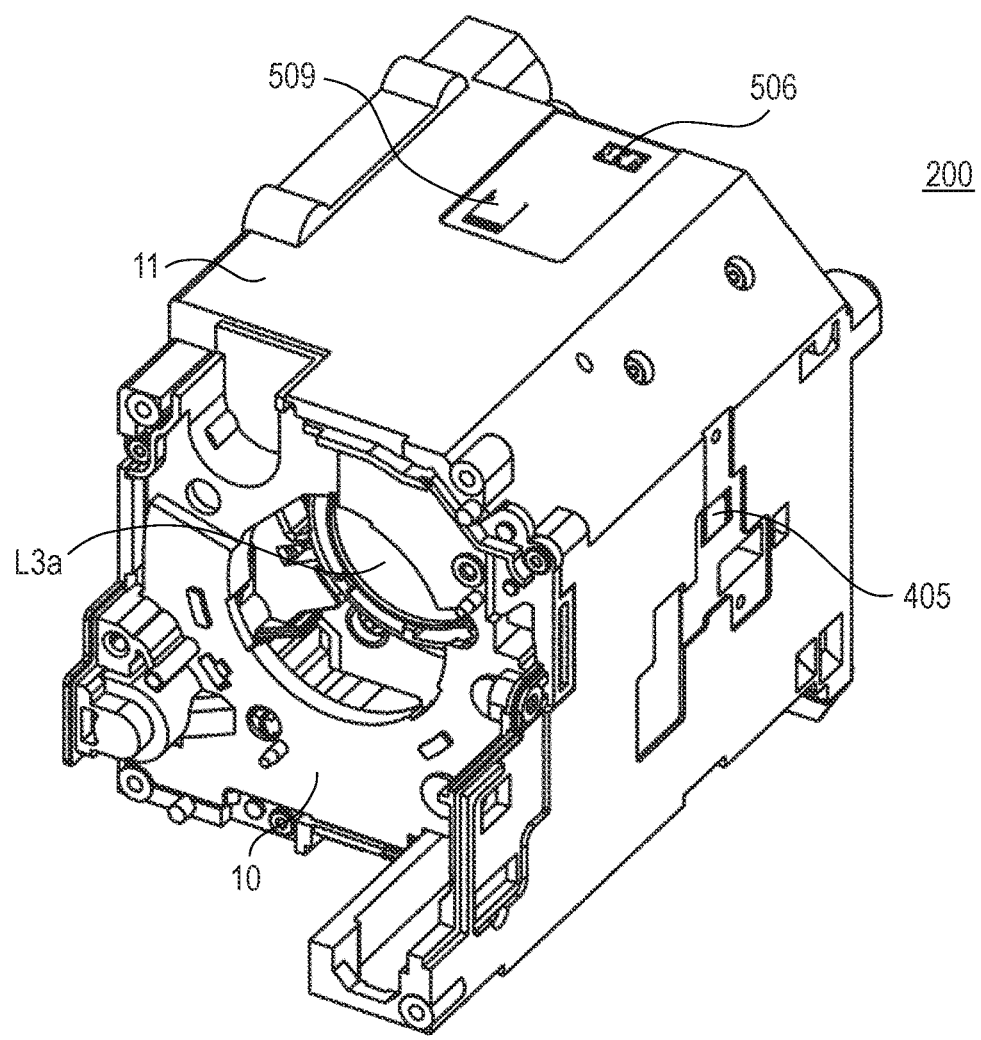
FIG. 2 is a perspective view of a driving unit of Embodiment 1.
Figure 3:
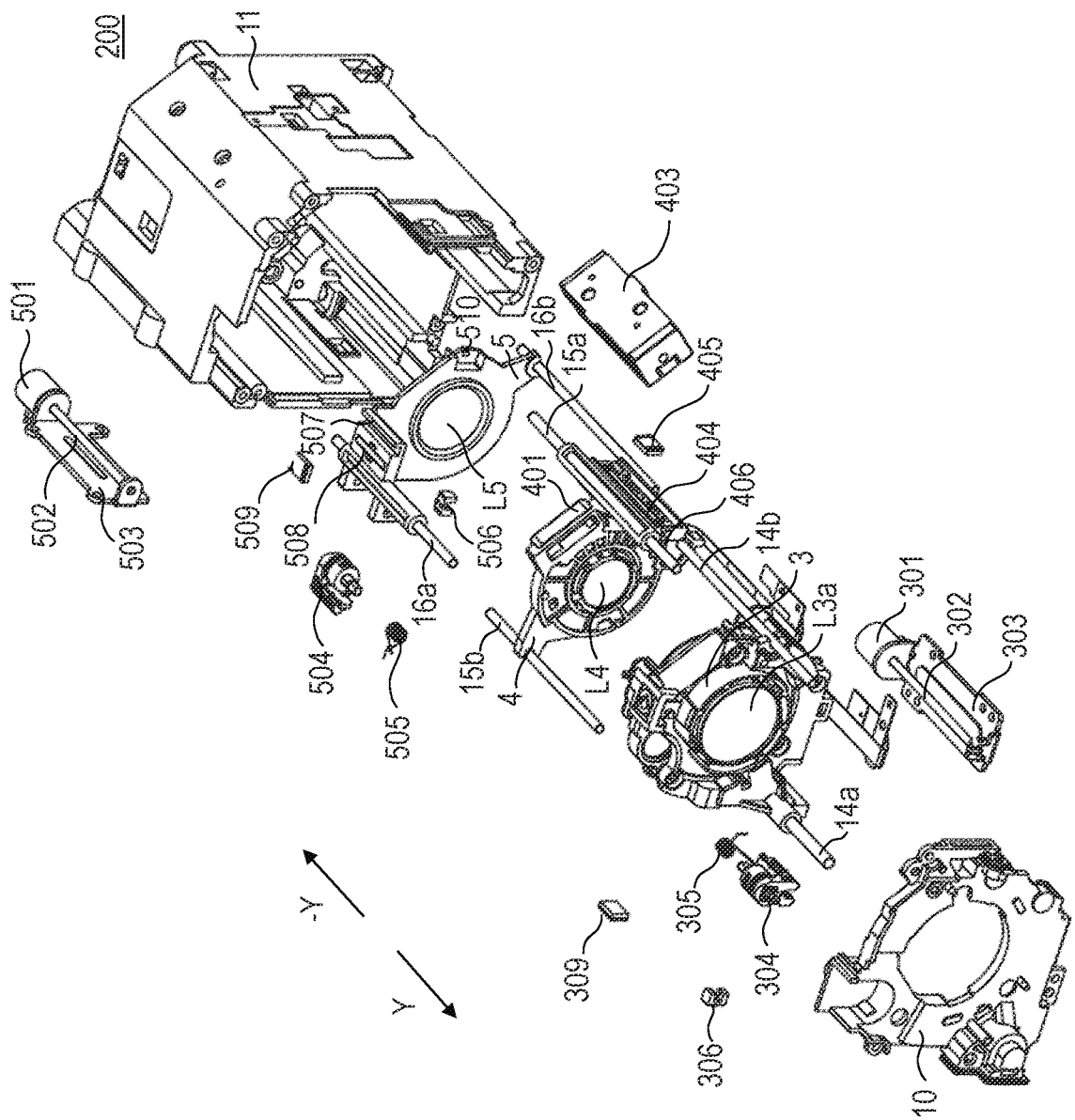
FIG. 3 is an exploded perspective view of the driving unit of Embodiment 1 viewed from an object side.
Figure 4:
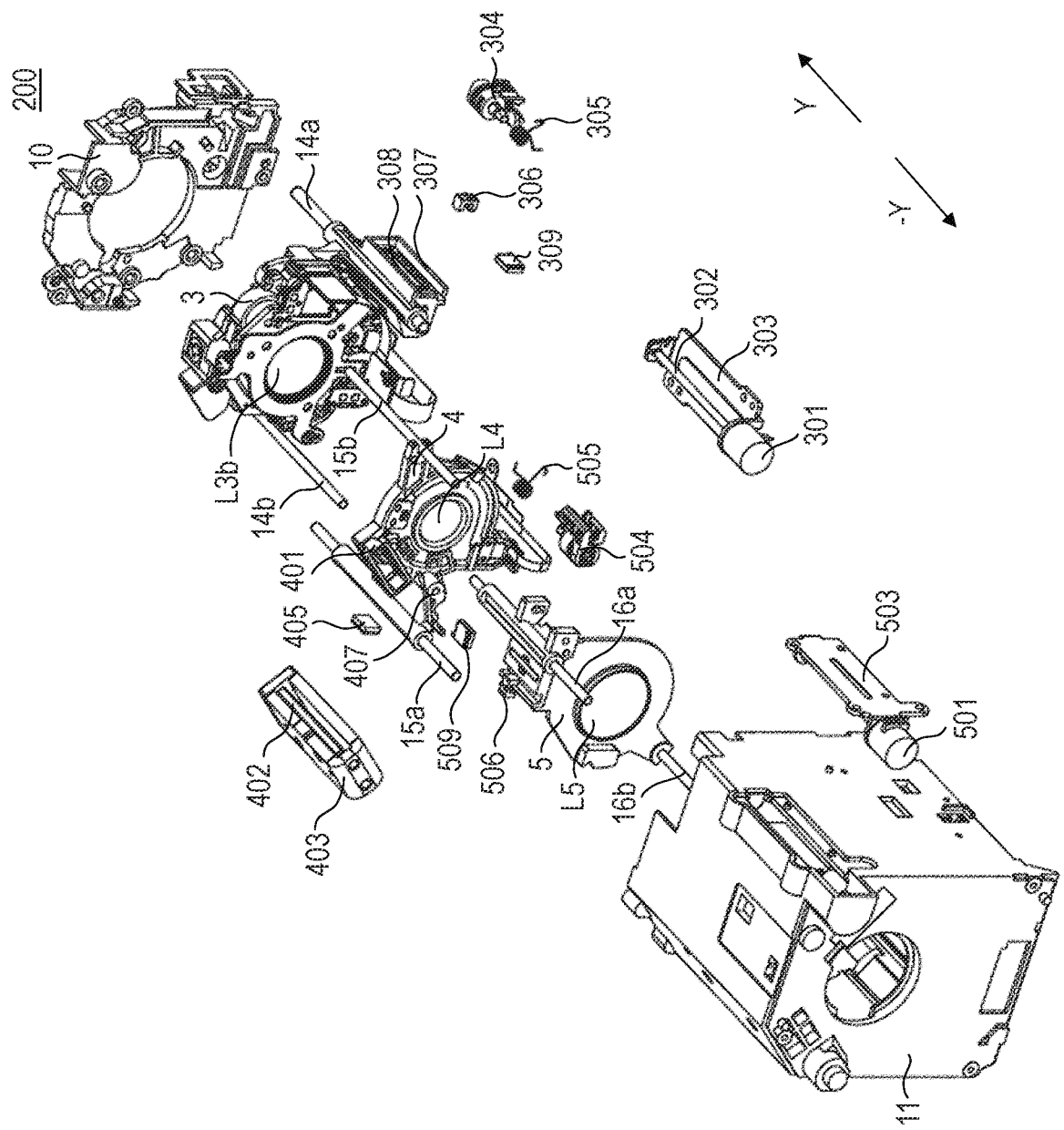
FIG. 4 is an exploded perspective view of the driving unit of Embodiment 1 viewed from an image side.
Figure 5:
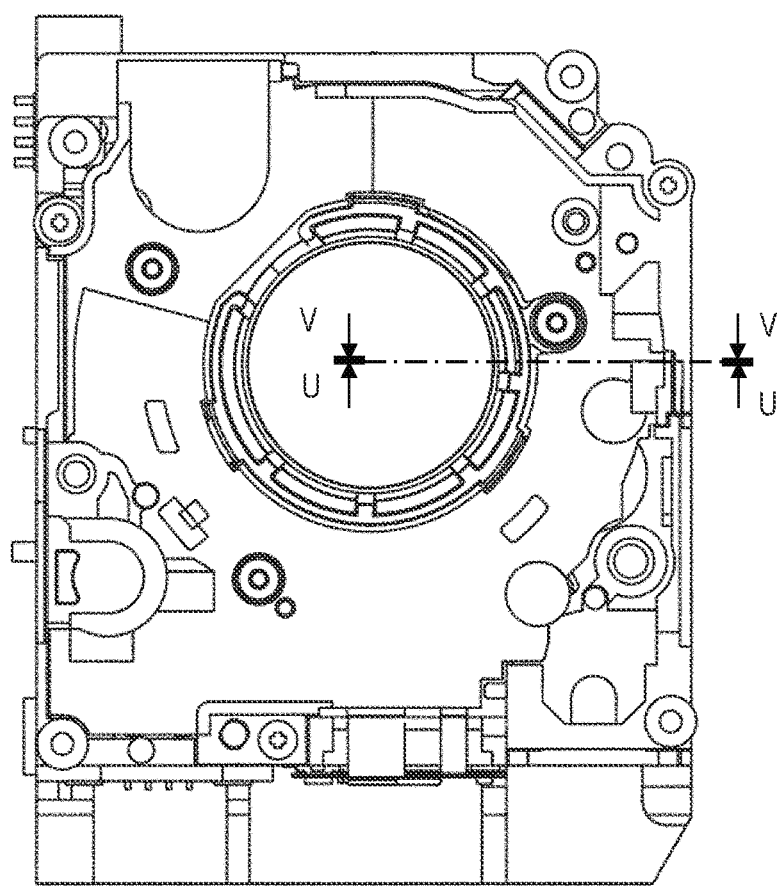
FIG. 5 shows a front view of the driving unit of Embodiment 1.
Figure 6:
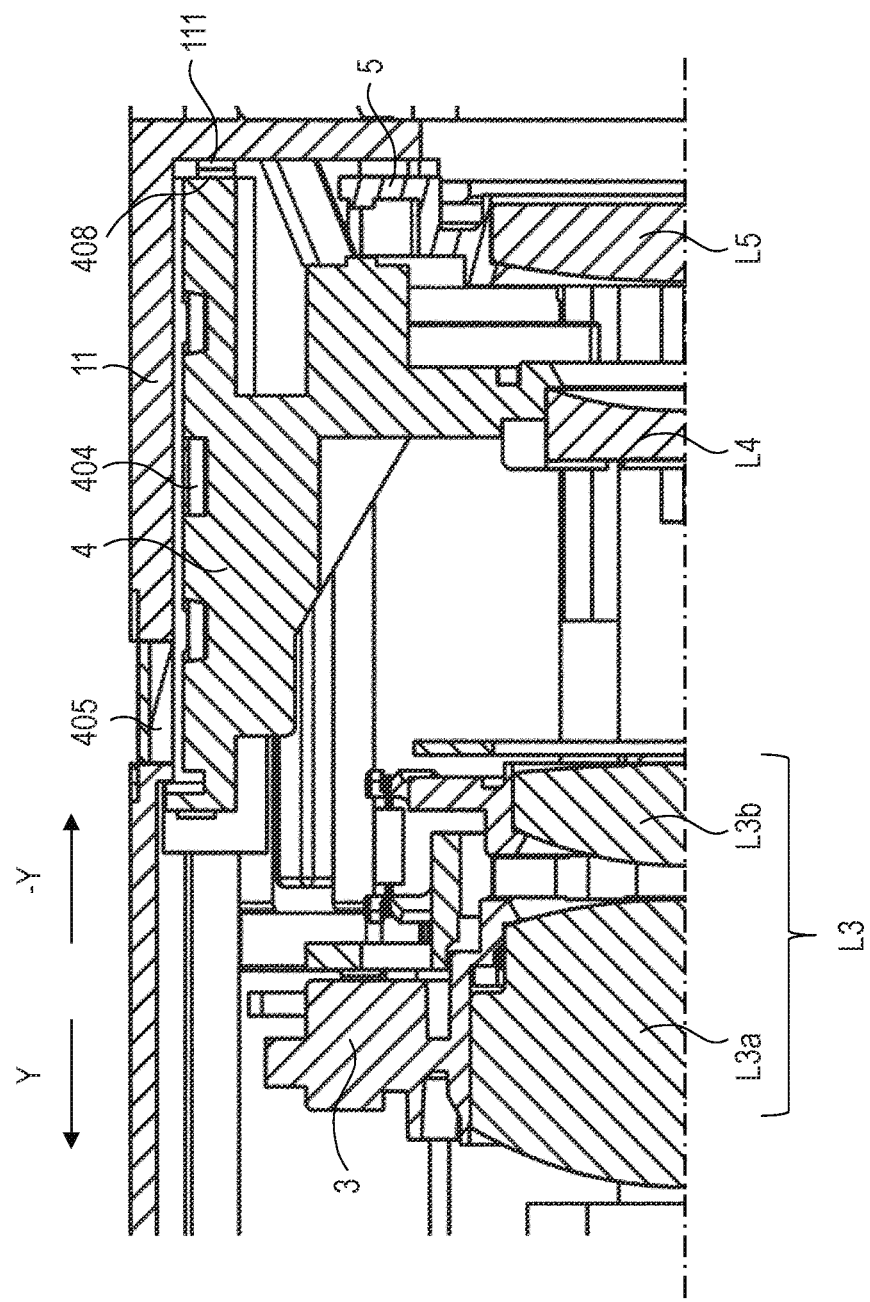
FIG. 6 is a U-U sectional view in FIG. 5 showing a reference position of a second moving frame of Embodiment 1.
Figure 7:
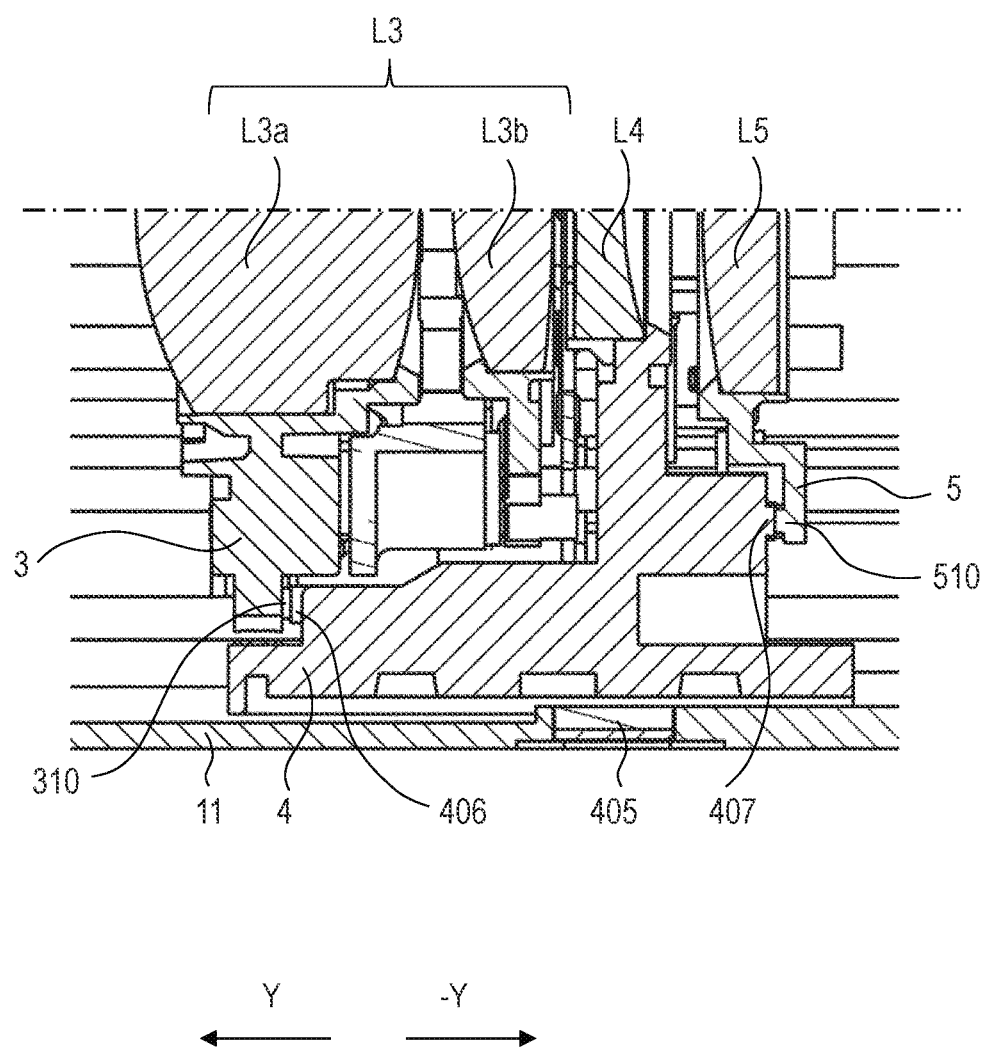
FIG. 7 is a V-V sectional view in FIG. 5 showing a limited state of the second moving frame of Embodiment 1.

In the driving unit 200 in Embodiment 1 of the disclosure, FIG. 2 is an overall perspective view, FIG. 3 is an exploded perspective view viewed from the object side, FIG. 4 is an exploded perspective view viewed from the image side, FIG. 5 is a front view, FIG. 6 is a U-U sectional view in FIG. 5, and FIG. 7 is a V-V sectional view in FIG. 5.

The first moving frame 3 has a first stopper 310 (first limiting portion) that projects toward the second moving frame 4 (second moving frame) in the optical axis direction. A third guide bar 14a and the fourth guide bar 14b are held at both ends by the middle fixed barrel 10 and the rear fixed barrel 11. The first moving frame 3 is movably supported in the optical axis direction by the third guide bar 14a and the fourth guide bar 14b.

The second moving frame 4 has a first convex portion 406 (first limited portion) protruding toward the first moving frame 3 side in the optical axis direction, and a second convex portion 407 (second limited portion) protruding toward the third moving frame 5 side and a third convex portion 408.

The fifth guide bar 15a and the sixth guide bar 15b are held at both ends by the middle fixed barrel 10 and the rear fixed barrel 11. The second moving frame 4 is supported movably in the optical axis direction by the fifth guide bar 15a and the sixth guide bar 15b.

The third moving frame 5 has a second stopper 510 (second limiting portion) that protrudes in the optical axis direction towards the second moving frame 4 side.

A seventh guide bar 16a and an eighth guide bar 16b are held at both ends by the middle fixed barrel 10 and the rear fixed barrel 11. The third moving frame 5 is supported movably in the optical axis direction by the seventh guide bar 16a and the eighth guide bar 16b.

Next, a configuration of a driving part for moving the first moving frame 3 will be described.

A first stepping motor 301 (first driving part) drives the first moving frame 3 in the optical axis direction. A first lead screw 302 is formed on the output shaft of the first stepping motor 301. The first stepping motor 301 is fixed to the rear fixed barrel 11 via a first supporting member 303. A first lead screw 302 meshes with a first rack 304 attached to the first moving frame 3. Therefore, when the first stepping motor 301 is energized and the first lead screw 302 is rotated, the first moving frame 3 is moved in the optical axis direction via the first rack 304.

Backlash between the first rack 304 and the first moving frame 3 in the optical axis direction is reduced owing to biasing force of a first torsion coil spring 305.

In a state where the first stepping motor 301 is not energized (unenergized state), the first moving frame 3 has a self-holding force because the first rack 304 and the first lead screw 302 are engaged.

The first reset 306 is a zoom reset for detecting a reference position of the first moving frame 3, and is a photointerrupter for detecting a switching between shading and translucent states by a movement of a first light shielding member 307 formed in the first moving frame 3 toward the optical axis. The first reset 306 is secured to the rear fixed barrel 11 via a substrate (not shown).

A first scale 308 is a reflective film scale that makes up an optical position detection encoder and is held by the first moving frame 3. A first sensor head 309 is a photo IC chip incorporating a light source equipped with an LED chip and a circuit that processes signals of light from the light source reflected by the first scale 308. The first sensor head 309 is fixed at a position of the rear fixed barrel 11 opposite to the first scale 308 via a substrate (not shown). Using a signal from the first sensor head 309, an amount of movement of the first moving frame 3 from a given reference position (the first reset 306) is detected.

Next, a configuration of a driving section for moving the second moving frame 4 will be described.

A voice coil motor (second drive unit) consists of a driving coil 401, a drive magnet 402 and a yoke member 403 for closing magnetic flux. The driving coil 401 is attached to the second moving frame 4. The drive magnet 402 is located within the yoke member 403 and the yoke member 403 is attached to the rear fixed barrel 11. When an electric current is applied to the driving coil 401 (energized), a Lorentz force is generated between the drive magnet 402 and the driving coil 401 due to a mutual repulsion between the magnetic field lines. The Lorentz force at this time drives the second moving frame 4 in the optical axis direction. When the driving coil 401 is not energized (unenergized), no driving force is generated to the second moving frame 4, and the second moving frame 4 has no holding force with respect to its position in the optical axis direction.

The second scale 404 is a reflective film scale that makes up an optical position detection encoder and is held by the second moving frame 4. A second sensor head 405 is a photo IC chip incorporating a light source equipped with an LED chip and a circuit that processes signals of light from the light source reflected by the second scale 404. The second sensor head 405 is fixed at a position of the rear fixed barrel 11 opposite to the second scale 404 via a substrate (not shown). Using signal from the second sensor head 405, an amount of movement of the second moving frame 4 from a given reference position is detected. Here, the reference position of the second moving frame 4 is a position of the second moving frame 4 when the third convex portion 408 as an end (mechanical end) of the movable range of the second moving frame 4 in the optical axis direction and a third stopper 111 of the rear fixed barrel 11 abut to each other as shown in FIG. 6.

Next, a configuration of the driving unit for moving the third moving frame 5 will be described.

A second stepping motor 501 (third driving unit) drives the third moving frame 5 in the optical axis direction. A second lead screw 502 is formed on an output shaft of the second stepping motor 501. The second stepping motor 501 is fixed to the rear fixed barrel 11 via a second supporting member 503. The second lead screw 502 meshes with a second rack 504 attached to the third moving frame 5. Therefore, when the second stepping motor 501 is energized and the second lead screw 502 is rotated, the third moving frame 5 is moved in the optical axis direction via the second rack 504.

The second rack 504 and the third moving frame 5 are reduced their backlash in the optical axis direction owing to the biasing force of the second torsion coil spring 505. When the second stepping motor 501 is not energized (unenergized), the third moving frame 5 is in a state of having a self-holding force because the second rack 504 and the second lead screw 502 are engaged.

The second reset 506 is a zoom reset for detecting the reference position of the third moving frame 5, and a photo interrupter for detecting a switching of shading and translucent states caused by the movement of a second light shielding member 507 formed in the third moving frame 5 in the optical axis direction.

The second reset 506 is secured to the rear fixed barrel 11 via a substrate (not shown).

A third scale 508 is a reflective film scale that constitutes an optical position detection encoder and is held by the third moving frame 5.

A third sensor head 509 is a photo IC chip incorporating a light source equipped with an LED chip and a signal processing circuit for a light from the light source reflected by the third scale 508, and is fixed, via a board, at a position of the rear fixed barrel 11 facing the third scale 508.

Using the signal from third sensor head 509, an amount of movement of the third moving frame 5 from a given reference position (the second reset 506) is detected.

Positions of each lens units L1 to L5 in the optical axis direction at the time of shooting are determined based on a relationship stored in a memory (not shown) in advance depending on a shooting condition such as a focal length, an object distance, and the like. A controller (not shown) controls the driving units that drive lens units L1 to L5 based on the shooting condition to move lens units L1 to L5 in the optical axis direction.

In the following, a control mode when an operation to become unenergized is performed will be described with reference to FIGS. 7 and 8.

Figure 8:
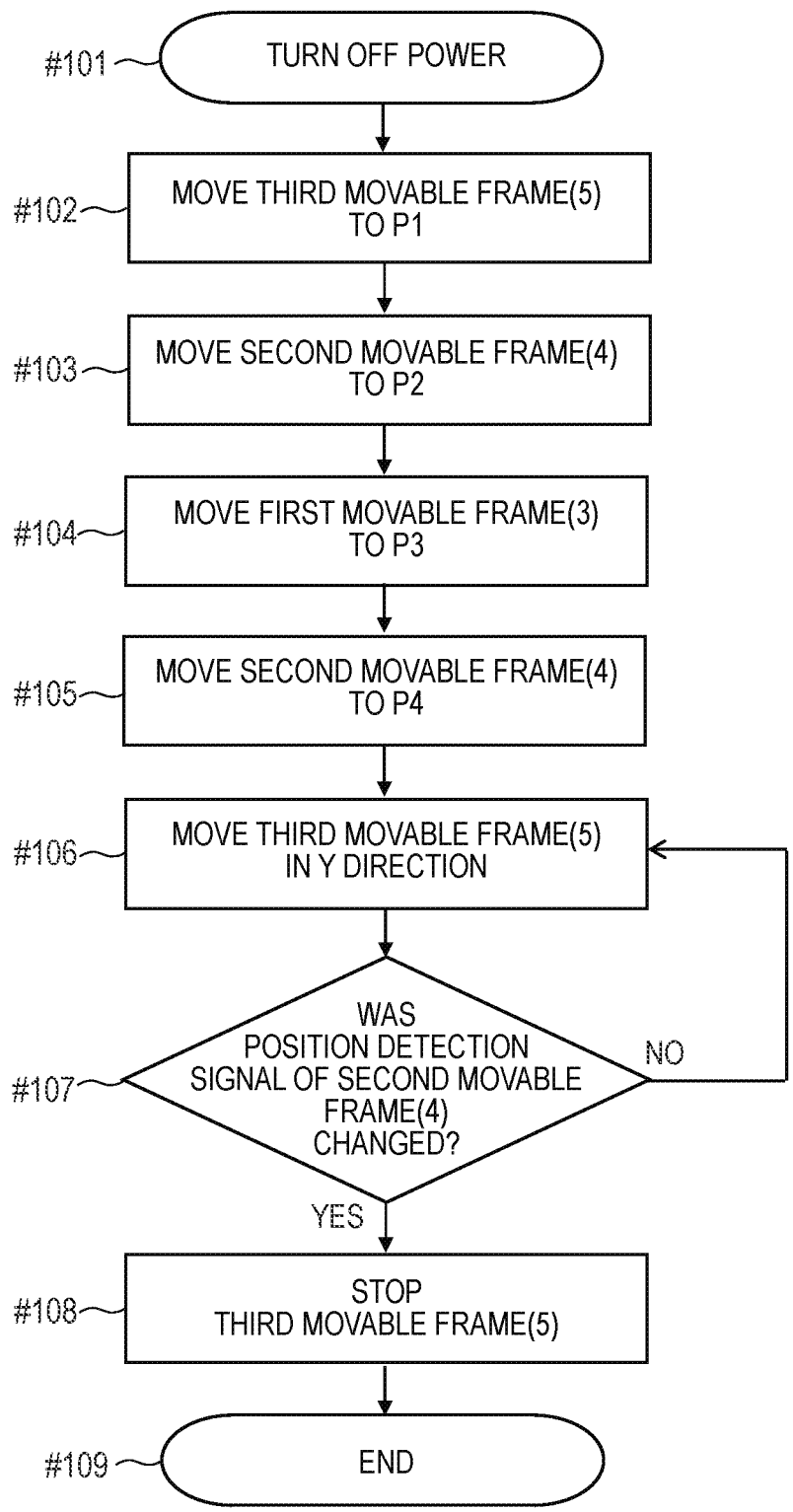
FIG. 8 is a flow chart showing a control mode of Embodiment 1 when not energized.

FIG. 8 is a flow chart showing the control mode under being unenergized in Embodiment 1.

In FIG. 8, when an operation to turn off the power (operation to be unenergized) is performed in Step #101, an operation from Step #102 is started by a controller (not shown) such as a microcomputer arranged in a camera body or the lens barrel.

In step #102, the third moving frame 5 is moved to a position (P1) outside the movable range in the image side (−Y direction) of the second moving frame 4. Here, the movable range of the second moving frame 4 refers to a movable range of the structural second moving frame 4. This action ensures a free movement space for second moving frame 4 to move toward the image side in the next step #103.

In step #103, the second moving frame 4 is moved to a position (P2) on the image side (−Y direction) of the first moving frame 3 and outside a shooting movable range of the first moving frame 3.

In step #104, the first moving frame 3 is moved to the most image side (−Y direction) position (P3) in the range of motion of the first moving frame 3. At this state, P3 is within the movable range of the second moving frame 4.

In step #105, the second moving frame 4 is moved to a position (P4) until the first stopper 310 of the first moving frame 3 and the first convex portion 406 of the second moving frame 4 come into abutting (contact).

In step #106, the third moving frame 5 is moved to the object side (Y direction). At this state, the second stopper 510 of the third moving frame 5 and the second convex portion 407 of the second moving frame 4 come into contact. Here, the movement of the third moving frame 5 toward the object side reaches beyond an optically used shooting range of movement (outside the shooting range of movement) in which the third moving frame 5 moves during shooting.

In step #107, a position of the second moving frame 4 is detected by the second scale 404 and the second sensor head 405, and whether or not the position of the second moving frame 4 has changed is determined.

If, as a result of the determination, it is determined that the position of the second moving frame 4 has changed, that is, if there is a gap or play between the second moving frame 4 and the first moving frame 3 in the optical axis direction, the process returns to Step #106 and repeats the same action.

On the other hand, if it is determined in step #107 that the position of the second moving frame 4 does not change, that is, if there is no gap or play between the second moving frame 4 and the first moving frame 3 in the optical axis direction, the process proceeds to Step #108 to stop the driving of the third moving frame 5 to become a state shown in FIG. 7.

At step #109, the first stepping motor 301, the voice coil motor (401 to 403) and the second stepping motor 501 are unenergized and the control mode is terminated.

When the first stopper 310 and the first convex portion 406 come into contact and the second stopper 510 and the second convex portion 407 come into contact, the movement of the second moving frame 4 in the optical axis direction is restricted and the position of the second moving frame 4 in the optical axis direction is maintained even in the unenergized state.

Moreover, the configuration may be opposite to the configuration described in the flowchart of embodiment 1 with respect to the optical axis direction, so that the effect of the disclosure can be similarly enjoyed.

In step #106, the third moving frame 5 is moved toward the object side to make abutting (contact) between the second stopper 510 of the third moving frame 5 and the second convex portion 407 of the second moving frame 4, but the disclosure is not limited thereto. The effect of reducing the collision sound can also be obtained by moving the third moving frame 5 toward the object side beyond the shooting movable range, and stopping the third moving frame 5 before coming into contact with the second moving frame 4 to make a distance between the moving frames narrower.

The shooting range of movement used for the third moving frame 5 may be configured so that a part of the shooting range overlaps a range of motion of the second moving frame 4, or it may not have an overlapping range.

Thus, in Embodiment 1, by limiting the second moving frame 4 by the first moving frame 3 and the third moving frame 5 both having a self-holding force, the generation of collision sound between the mechanical end and the second moving frame 4 due to the movement of the second moving frame can be reduced even in unenergized state.

Embodiment 2

Figure 9:
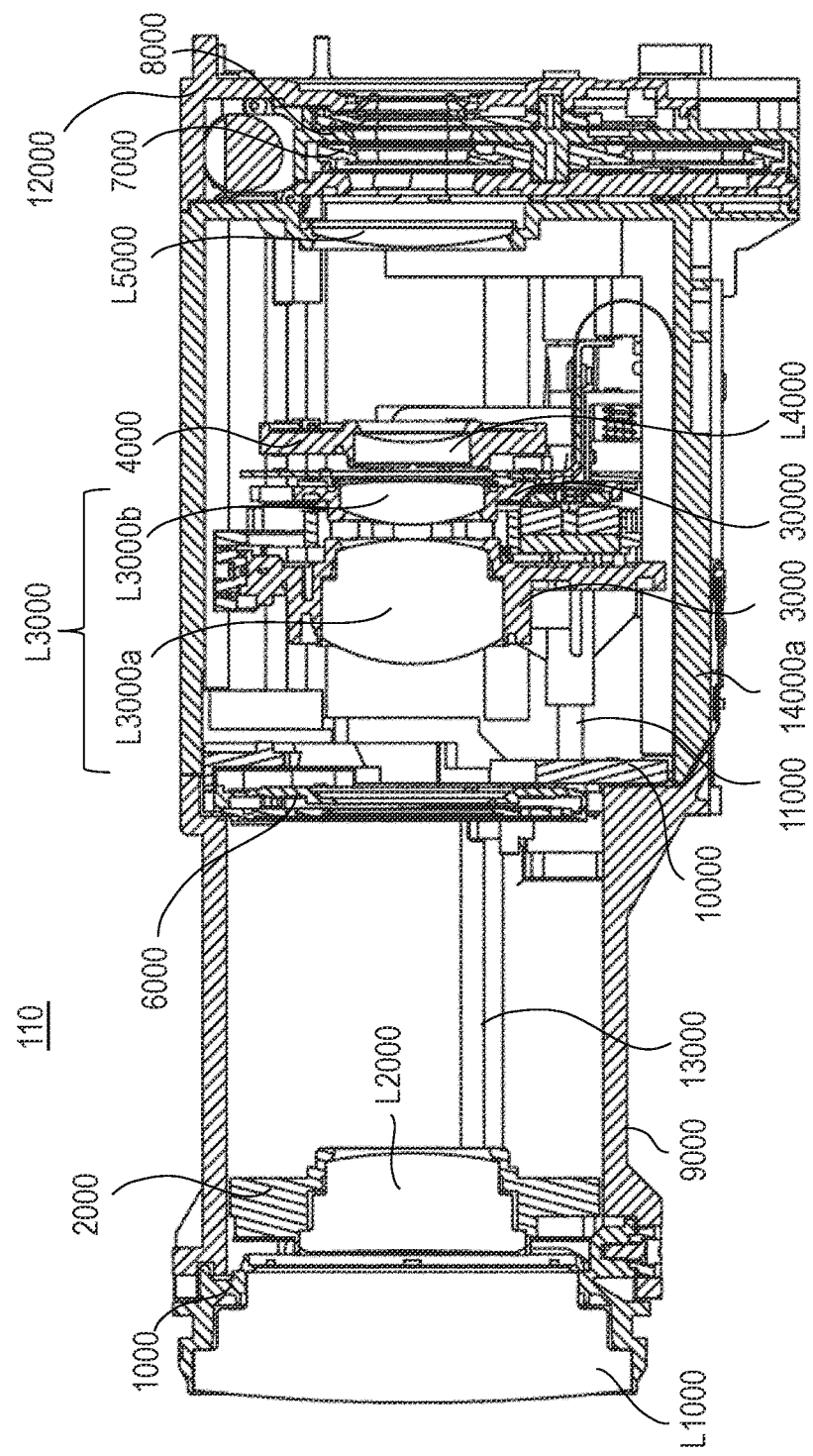
FIG. 9 is a sectional view of whole of a lens barrel of Embodiment 2.

FIG. 9 is a sectional view of a lens barrel 110 of Embodiment 2 of the disclosure.

The lens barrel 110 is equipped with a magnification-varying optical system (zoom lens system) composed of five lens units L1000, L2000, L3000, L4000, L5000, light amount adjusting unit 6000, ND unit 7000 and IR unit 8000.

The first lens unit L1000 is configured not to move in the optical axis direction.

The second lens unit L2000 and the third lens unit L3000 have a zooming effect by moving in the optical axis direction.

The third lens unit L3000, which consists of a 3a lens subunit L3000a and a 3b lens unit L3000b, is not only for varying magnification but also an optical system for image stabilization.

The 3b lens subunit L3000b is an image stabilizing lens unit that is shifted in a direction perpendicular to the optical axis of the image pickup optical system to reduce an image blurring.

The fourth lens unit L4000 has an effect of correcting of the image plane variation associated with zooming by moving in the optical axis direction and focus adjustment.

The fifth lens unit L5000 is configured not to move in the optical axis direction.

The first holding frame 1000 holds the first lens unit L1000. An L2 moving frame 2000 holds the second lens unit L2000. The first moving frame 3000 holds the 3a lens subunit L3000a.

An image stabilization moving frame 30000 holds the 3b lens subunit L3000b. The image stabilization moving frame 30000 is mounted to the first moving frame 3000 while movable in a direction perpendicular to the optical axis.

The second moving frame 4000 holds the fourth lens unit L4000. A rear fixed barrel (a fastening member) 11000 holds the fifth lens unit L5000. A front end of a front fixed barrel 9000 is fixed to the first holding frame 1000 to secure the first lens unit L1000 in place. Also, a rear end of the front fixed barrel 9000 is coupled to the rear fixed barrel 11000.

A middle fixed barrel 10000 holds the light amount adjusting unit 6000, a rear end of the middle fixed barrel 10000 is coupled to the rear fixed barrel 11000.

In order to change the aperture diameter of the optical system, the light amount adjusting unit 6000 moves aperture blades in a plane perpendicular to the optical axis by a driving unit (not shown) to adjust the amount of light. The rear fixed barrel 11000 is coupled at its front end to the front fixed barrel 9000 and the middle fixed barrel 10000 and at its rear end to the second holding frame 12000 described below. The second holding frame 12000 is coupled at its front end with the rear fixed barrel 11000 and includes an ND unit 7000, an IR unit 8000 and an image pickup element (not shown).

When a light quantity adjustment is performed by changing an area of the aperture of the aperture stop, the aperture becomes small when photographing a high-brightness object, and the optical performance deteriorates due to the diffraction phenomenon of light, so the ND unit 7000 uses a filter to reduce the amount of light.

The IR unit 8000 has a mechanism in which an infrared light cut filter is placed in front of the image pickup element in the optical axis direction for use in a visible light range and the infrared light cut filter is removed for use in a near infrared light range.

An image pickup element (not shown) is an image pickup unit that photoelectrically converts an object image formed by the first to fifth lens units L1000, L2000, L3000, L4000 and L5000.

The first guide bar (not shown) and the second guide bar 13000 are held at both ends by the front fixed barrel 9000, the middle fixed barrel 10000 and the rear fixed barrel 11000.

The L2 moving frame 2000 is movably supported in the optical axis direction by the first guide bar and the second guide bar 13000.

The components of the driving unit 210 involved in Embodiment 2 are described in detail below with reference to FIGS. 10 to 14.

Figure 10:
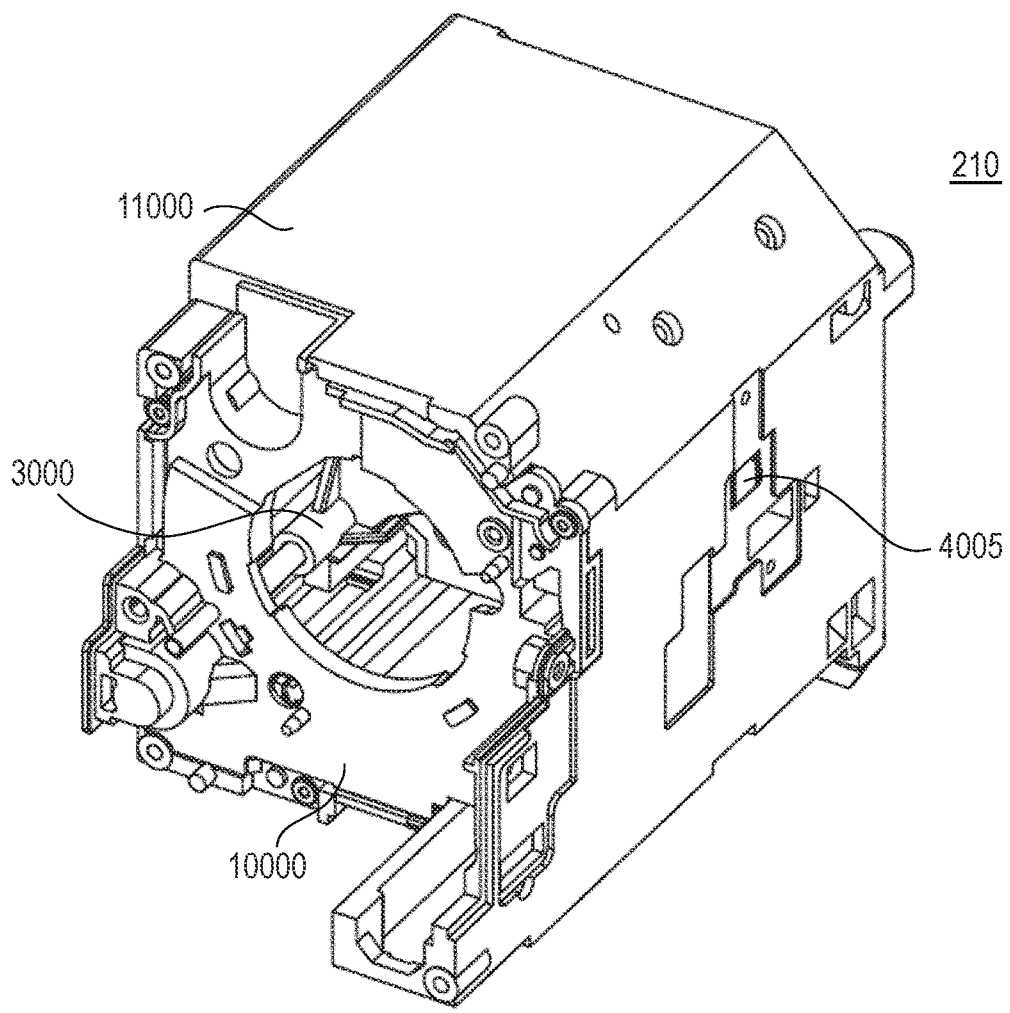
FIG. 10 is a perspective view of the driving unit of Embodiment 2.
Figure 11:
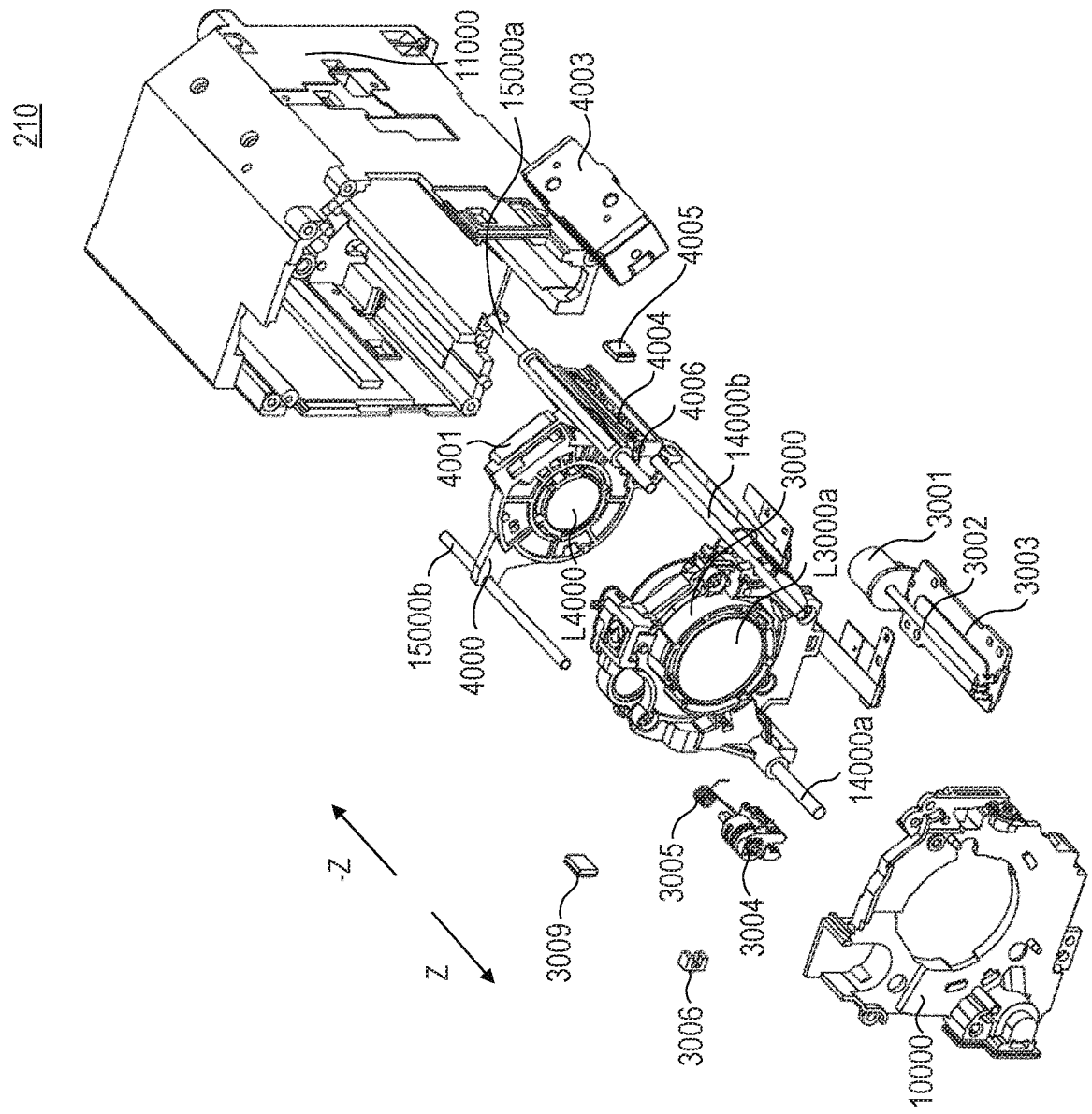
FIG. 11 is an exploded perspective view of the driving unit of Embodiment 2 viewed from the object side.
Figure 12:
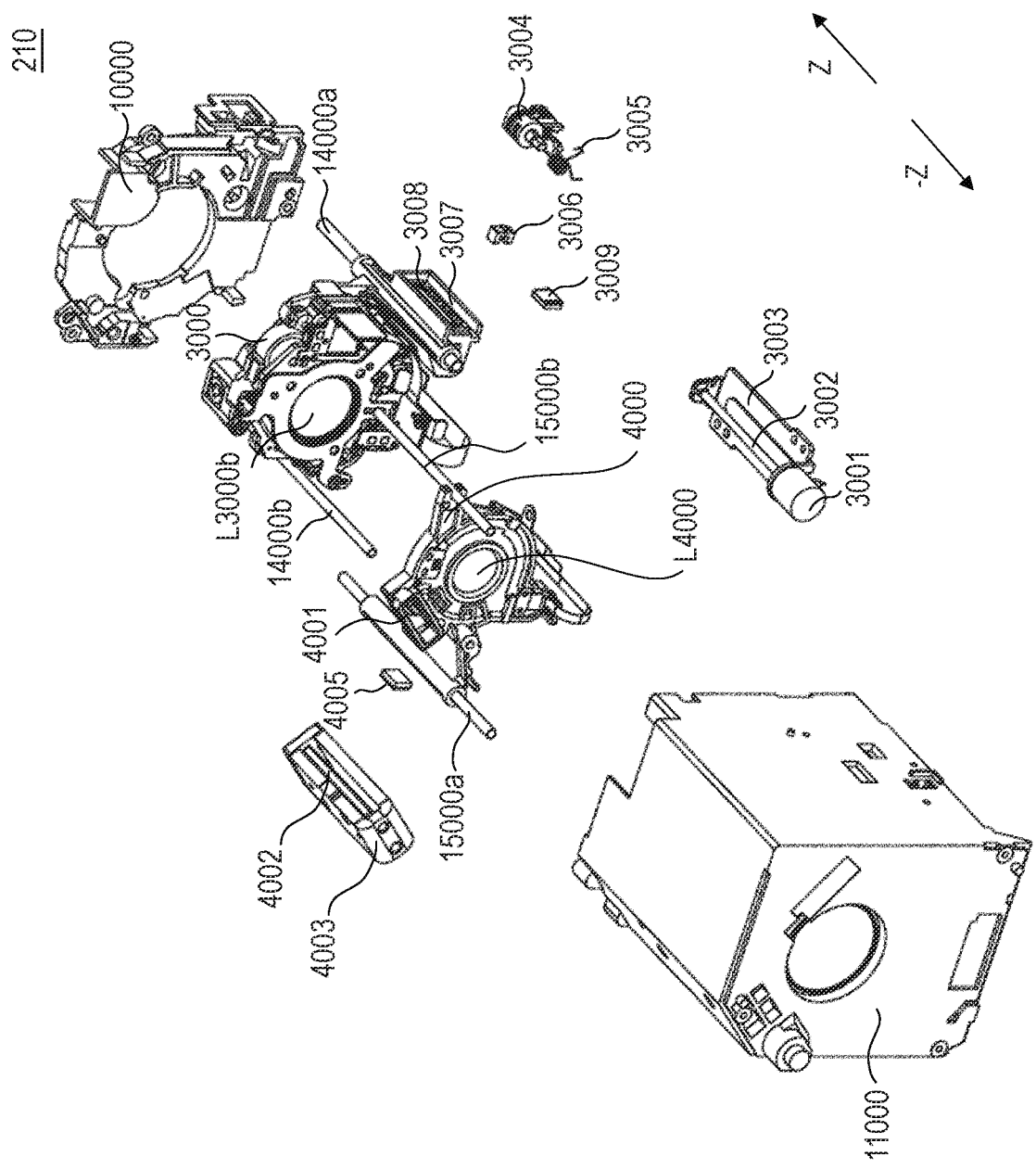
FIG. 12 is an exploded perspective view of the driving unit of Embodiment 2 viewed from the image side.
Figure 13:
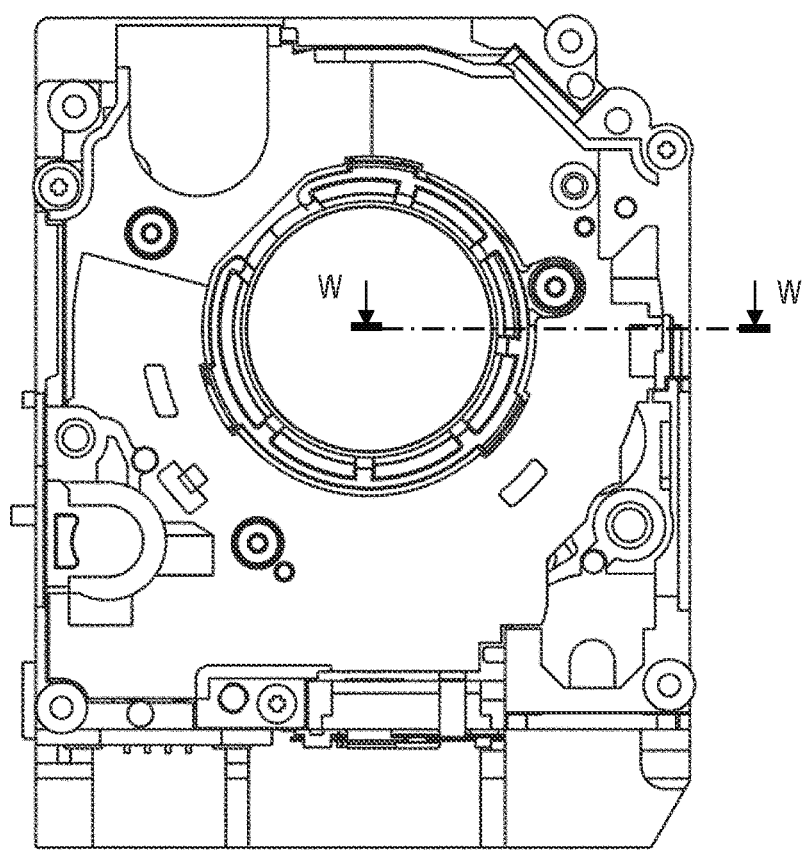
FIG. 13 shows a front view of the driving unit of Embodiment 2.
Figure 14:
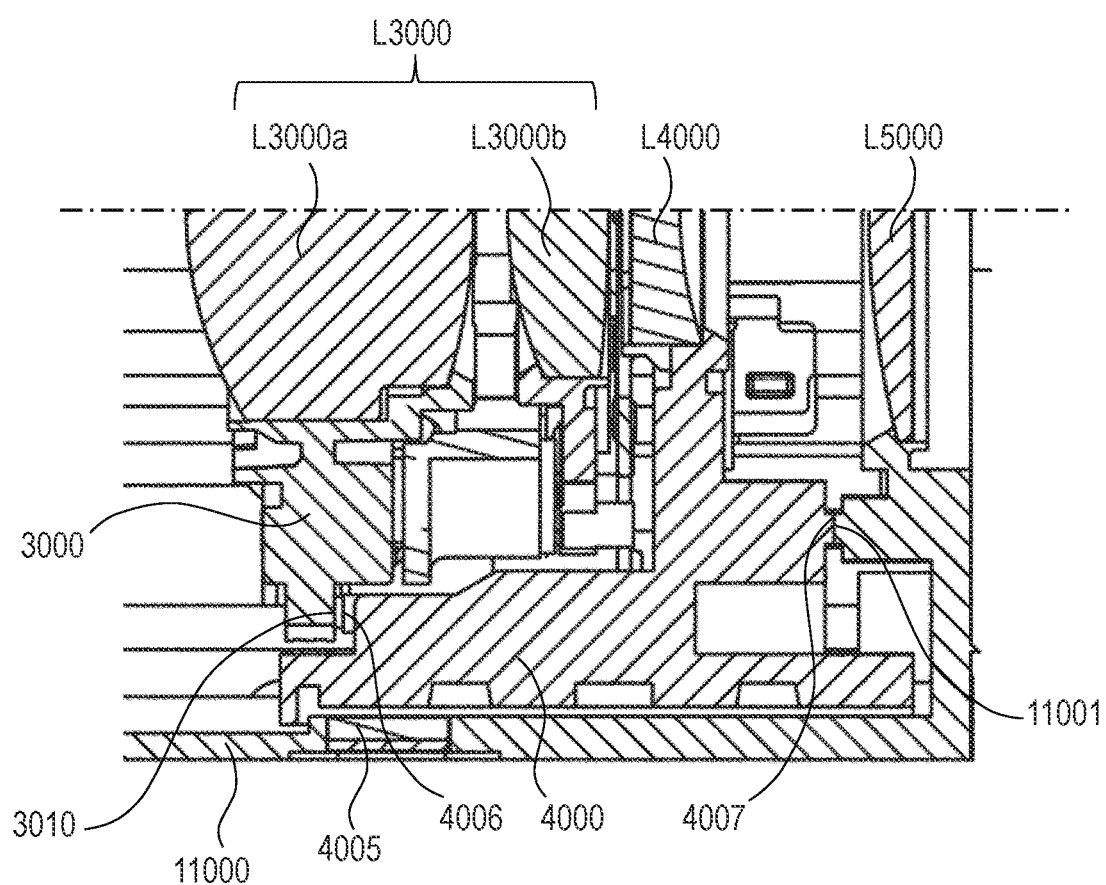
FIG. 14 is a W-W sectional view in FIG. 13 showing the limited state of the second moving frame of Embodiment 2.

In the driving unit 210 in Embodiment 2 of the disclosure, FIG. 10 is an overall perspective view, FIG. 11 is an exploded perspective view viewed from the object side, FIG. 12 is an exploded perspective view viewed from the image side, FIG. 13 is a front view, and FIG. 14 is a W-W sectional view of FIG. 13.

The first moving frame 3000 (first moving frame) has a first stopper 3010 (first limiting part) projecting toward a side of the second moving frame 4000 (second moving frame) in the optical axis direction. The third guide bar 14000a and the fourth guide bar 14000b are held at their both ends by the middle fixed barrel 10000 and the rear fixed barrel 11000. The first moving frame 3000 is supported by the third guide bar 14000a and the fourth guide bar 14000b while movable in the optical axis direction.

The second moving frame 4000 (second moving frame) has the first convex portion 4006 (first limited portion) that projects toward a side of the first moving frame 3000 in optical axis direction and the second convex portion 4007 (second limited portion) that projects toward a side of the rear fixed barrel 11000.

The fifth guide bar 15000a and the sixth guide bar 15000b are held at their both ends by the middle fixed barrel 10000 and the rear fixed barrel 11000. The second moving frame 4000 is supported by the fifth guide bar 15000a and the sixth guide bar 15000b while movable in the optical axis direction. The rear fixed barrel 11000 has the second stopper 11001 (second limiting portion) that projects in a side of the second moving frame 4000 in the optical axis direction.

Next, the configuration of the driving unit for moving the first moving frame 3000 will be described.

A stepping motor 3001 (first driving unit) drives the first moving frame 3000 in the optical axis direction. A lead screw 3002 is formed on an output shaft of the stepping motor 3001. The stepping motor 3001 is fixed to the rear fixed barrel 11000 via a supporting member 3003. The lead screw 3002 meshes with a rack 3004 attached to the first moving frame 3000. Therefore, when the stepping motor 3001 is energized and the lead screw 3002 is rotated, the first moving frame 3000 is moved in the optical axis direction via the rack 3004.

The rack 3004 and the first moving frame 3000 have reduced their backlash therebetween in the optical axis direction by a biasing force of the torsion coil spring 3005. When the stepping motor 3001 is not energized (unenergized), the first moving frame 3000 is in a state of having a self-holding force because the rack 3004 and the lead screw 3002 are engaged with each other.

The reset 3006 is a zoom reset for detecting the reference position of the first moving frame 3000, and a photo interrupter for detecting the switching of the shading and translucency states caused by the movement of the light shielding member 3007 formed in the first moving frame 3000 in the optical axis direction. The reset 3006 is secured to the rear fixed barrel 11000 via a substrate (not shown).

The first scale 3008 is a reflective film scale that constitutes an optical position detection encoder and is held by the first moving frame 3000. The first sensor head 3009 is a photo IC chip incorporating a light source equipped with an LED chip and a circuit that processes signals of light from the light source reflected by the first scale 3008. The first sensor head 3009 is fixed at a position of the rear fixed barrel 11000 opposite to the first scale 3008 via a substrate (not shown). Using the signal from the first sensor head 3009, the amount of movement of the first moving frame 3000 from a given reference position (reset 3006) is detected.

Next, a configuration of the driving unit for moving the second moving frame 4000 will be described.

The voice coil motor (second driving unit) consists of a driving coil 4001, a drive magnet 4002 and a yoke member 4003 for closing magnetic flux. The driving coil 4001 is attached to the second moving frame 4000. The drive magnet 4002 is located within the yoke member 4003 and the yoke member 4003 is attached to the rear fixed barrel 11000.

When an electric current is applied to the driving coil 4001 (energized), a Lorentz force is generated between the drive magnet 4002 and the driving coil 4001 due to a mutual repulsion of the magnetic field lines. The Lorentz force at this time drives the second moving frame 4000 in the optical axis direction. When the driving coil 4001 is not energized (unenergized), no driving force is generated to the second moving frame 4000, and the second moving frame 4000 has no holding force with respect to its position in the optical axis direction.

The second scale 4004 is a reflective film scale that constitutes an optical position detection encoder and is held by the second moving frame 4000. The second sensor head 4005 is a photo IC chip incorporating a light source equipped with an LED chip and a circuit that processes signals of light from the light source reflected by the second scale 4004. The first sensor head 3009 is fixed via a substrate (not shown) at a position of the rear fixed barrel 11000 opposite the second scale 4004. Using the signal from the second sensor head 4005, an amount of movement of the second moving frame 4000 from a given reference position is detected.

Here, the reference position of the second moving frame 4000 is a position of the second moving frame 4000 when the second convex portion 4007 as an end (mechanical end) of the movable range of the second moving frame 4000 in the optical axis direction abuts against the second stopper 11001 of the rear fixed barrel 11000, as shown in FIG. 14.

Hereafter, a control mode when an operation to become unenergized state is performed will be described with reference to FIGS. 14 and 15.

Figure 15:
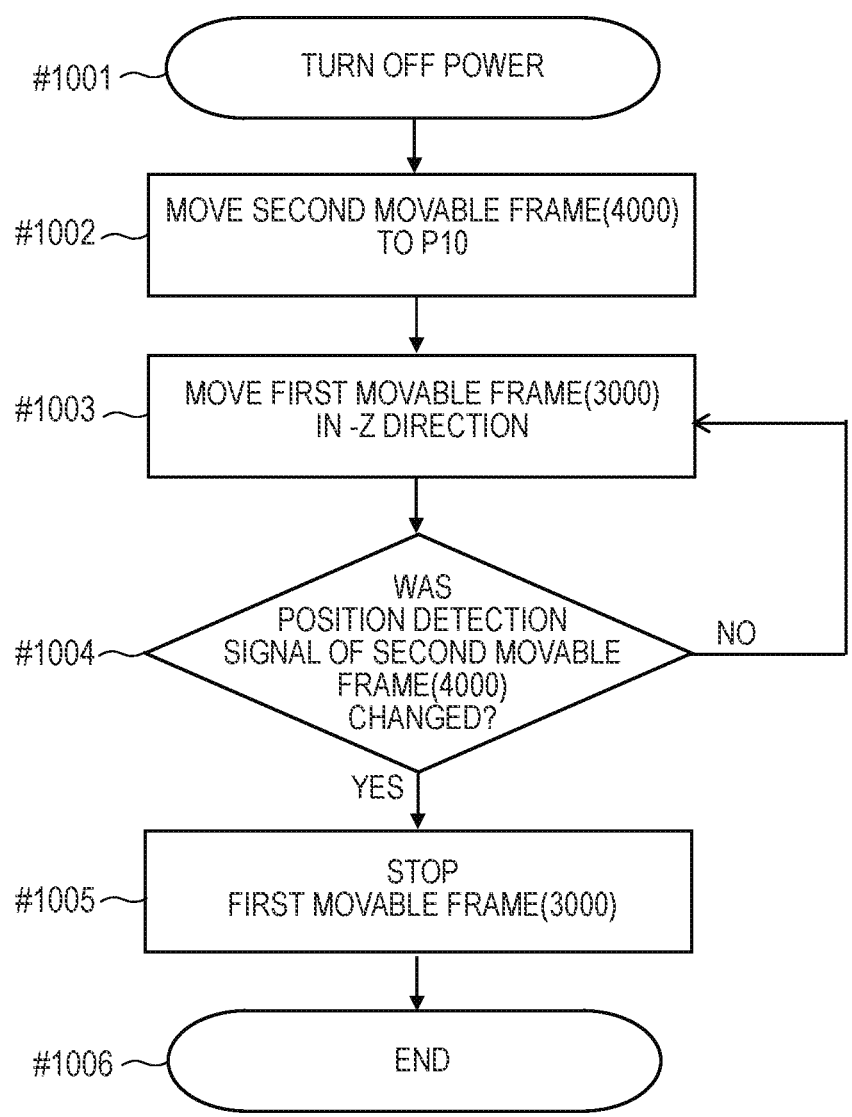
FIG. 15 is a flow chart showing a control mode of Embodiment 2 when not energized.

FIG. 15 is a flow chart showing the control mode under being unenergized in Embodiment 2.

When an operation to become unenergized state (operation to turn the power off) is performed in step #1001, the operation from step #1002 is started by an unillustrated controller such as a microcomputer arranged in the camera body or the lens barrel.

In step #1002, the second moving frame 4000 is moved to a position (P10) until the second stopper 11001 abuts (contact) with the second convex portion 4007.

In step #1003, the first moving frame 3000 is moved to the image side (−Z direction). At this point, the first stopper 3010 and the first convex portion 4006 come into contact. The abutted position of the first moving frame 3000 is located outside the range where the first moving frame 3000 moves during shooting (outside the shooting movable range).

In Step #1004, the position of the second moving frame 4000 is detected by the second scale 4004 and the second sensor head 4005, and whether or not the position of the second moving frame 4000 has changed is determined. If, as a result of the determination, it is determined that the position of the second moving frame 4000 has changed, the process returns to step #1003 and the same operation is repeated. On the other hand, if it is determined in step #1004 that the position of the second moving frame 4000 has not changed, this means that there is no play or gap between the moving frame and the rear fixed barrel 11000 and between the moving frames. In that case, the process proceeds to Step #1005 to stop the first moving frame 3000, and to become the state shown in FIG. 14.

In Step #1006, the stepping motor 3001 and the voice coil motors (4001 to 4003) are unenergized and the control mode is terminated. When the first stopper 3010 and the first convex portion 4006 come into contact, and the second stopper 11001 and the second convex portion 4007 come into contact, the second moving frame 4000 is regulated and the position of the second moving frame 4000 in the optical axis direction is maintained even in unenergized state.

Thus, in Embodiment 2, by regulating the second moving frame 4000 by the first moving frame 3000 having the self-holding force and the rear fixed barrel 11000, the generation of collision sound between the mechanical end and the second moving frame 4000 due to the movement of the second moving frame can be suppressed even in unenergized state.

In the flow in the flowchart of FIG. 15 in Embodiment 2, the first moving frame 300 is moved out of the shooting movement range in the image side, to interpose the second moving frame 4000 between the rear fixed barrel 11000 and the first moving frame 300 to retain the position of the second moving frame 4000. However, the invention is not limited to this. The collision sound can also be reduced by narrowing the movable range of the second moving frame 4000 between the first moving frame 3000 and the rear fixed barrel 11000 without moving the first moving frame 3000 out of the shooting movement range to sandwich the second moving frame 4000.

Moreover, the configuration may be opposite to the configuration described in the flowchart of Embodiment 2 with respect to the optical axis direction, so that the effect of the disclosure can be similarly enjoyed.

Also, by constituting an image pickup apparatus having a lens apparatus of the aspect of the embodiments and an image pickup element for picking up an image formed by the shooting lens apparatus, an image pickup apparatus enjoying the effect of the aspect of the embodiments can be provided.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-023384, filed Feb. 18, 2022, which is hereby incorporated by reference herein in its entirety.

What is claimed is:

1. An apparatus comprising:
   a first frame holding a first optical element, a second frame holding a second optical element, a third frame holding a third optical element, arranged in order along an optical axis;
   a first driving unit configured to move the first frame in an optical axis direction in an energized state, and hold a position of the first frame in an unenergized state;
   a second driving unit configured to move the second frame in the optical axis direction in the energized state, and not hold a position of the second frame in the unenergized state;
   a third driving unit configured to move the third frame in the optical axis direction in the energized state, and hold a position of the third frame in the unenergized state; and
   a controller configured to control the first driving unit, the second driving unit and the third driving unit,
   wherein the controller controls the second driving unit to become the unenergized state from the energized state after at least a part of at least one of the first frame and the third frame is moved within a movable range of the second frame.

2. The apparatus according to claim 1, wherein the controller controls the second driving unit to become the unenergized state from the energized state after moving at least one of the first frame and the third frame out of a movable range for an image pickup and within the movable range.

3. The apparatus according to claim 1, wherein the controller controls the second driving unit to become the unenergized state from the energized state after bringing the first frame and the second frame into contact with each other and bringing the second frame and the third frame into contact with each other.

4. An apparatus comprising: a first frame holding a first optical element, a second frame holding a second optical element, and a fixed member, arranged in order along an optical axis,
   a first driving unit configured to move the first frame in an optical axis direction in an energized state, and hold a position of the first frame in an unenergized state;
   a second driving unit configured to move the second frame in the optical axis direction in the energized state, and not hold a position of the second frame in the unenergized state;
   a controller configured to control the first driving unit and the second driving unit,
   wherein the controller controls the second driving unit to become the unenergized state from the energized state after at least a part of the first frame is moved outside a movable range for picking up an image of the first frame and within a movable range of the second frame.

5. The apparatus according to claim 4, wherein the controller controls the second driving unit to become the unenergized state from the energized state after bringing the first frame and the second moving frame into contact with each other and bringing the second frame and the fixing member into contact with each other.

6. The apparatus according to claim 1, wherein the first driving unit comprises a stepping motor having an output shaft on which a lead screw is formed.

7. The apparatus according to claim 1, wherein the third driving unit comprises a stepping motor having an output shaft on which a lead screw is formed.

8. The apparatus according to claim 1, wherein the second driving unit comprises a voice coil motor.

9. The apparatus according to claim 1, wherein the second optical element is configured to move for focusing.

10. The apparatus according to claim 1, wherein the first optical element is configured to move for zooming.

11. The apparatus according to claim 1, wherein the third optical element is configured to move for zooming.

12. The apparatus according to claim 1, wherein a movable range for picking up an image of the third frame has an overlapping range with a movable range of the second frame.

13. The apparatus according to claim 4, wherein the first driving unit comprises a stepping motor having an output shaft on which a lead screw is formed.

14. The apparatus according to claim 4, wherein the second driving unit comprises a voice coil motor.

15. The apparatus according to claim 4, wherein the second optical element is configured to move for focusing.

16. The apparatus according to claim 4, wherein the first optical element is configured to move for zooming.

17. A pickup apparatus comprising:
   the apparatus according to claim 1; and
   a pickup element configured to picking up an image formed by the apparatus.

18. The pickup apparatus according to claim 17, wherein the controller controls the second driving unit to become the unenergized state from the energized state after moving at least one of the first frame and the third frame out of a movable range for an image pickup and within the movable range.

19. The pickup apparatus according to claim 17, wherein the controller controls the second driving unit to become the unenergized state from the energized state after bringing the first frame and the second frame into contact with each other and bringing the second frame and the third frame into contact with each other.

20. The pickup apparatus according to claim 17,
   wherein the first driving unit comprises a stepping motor having an output shaft on which a lead screw is formed,
   wherein the second driving unit comprises a voice coil motor, and
   wherein the third driving unit comprises a stepping motor having an output shaft on which a lead screw is formed.

* * * * *